(12) United States Patent
Prozeniuk et al.

(10) Patent No.: US 7,826,598 B1
(45) Date of Patent: Nov. 2, 2010

(54) METHOD, SYSTEM AND APPARATUS FOR IDENTIFYING AN EMERGENCY SERVICE LOCATION OF AN INTERNET PROTOCOL TELEPHONY CLIENT

(75) Inventors: Perry Prozeniuk, Carleton Place (CA); Severin Beauvais, Belleville (CA); Larry Truesdale, Allen, TX (US); James Ronald Chisolm, Plano, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 1194 days.

(21) Appl. No.: 11/395,834

(22) Filed: Mar. 31, 2006

(51) Int. Cl.
*H04M 11/04* (2006.01)
(52) U.S. Cl. .................... 379/45; 455/556.1
(58) Field of Classification Search ............ 379/37–52; 370/395.52, 352
See application file for complete search history.

(56) References Cited

U.S. PATENT DOCUMENTS

2006/0120517 A1*  6/2006  Moon et al. .................. 379/45
2006/0188073 A1*  8/2006  Wright ......................... 379/45

* cited by examiner

*Primary Examiner*—Curtis Kuntz
*Assistant Examiner*—Maria El-Zoobi
(74) *Attorney, Agent, or Firm*—Christopher & Weisberg, P.A.

(57) ABSTRACT

A method, system and apparatus for providing emergency service location of an IP telephony client. A request for an emergency call is received from the IP telephony client. Subsequently, it is determined whether an actual location of the IP telephony client is encompassed by a first location data stored at a corresponding Automatic Location Identification (ALI) database that associates a unique identifier of the IP telephony client with the first location data. The unique identifier is sent for receipt by a Public Safety Answering Point (PSAP) associated with the ALI database, if the actual location is encompassed by the first location data. An Emergency Location Information Number (ELIN) is sent for receipt by the PSAP if the actual location is not encompassed by the first location data, wherein the ELIN is associated with the actual location at the ALI database.

17 Claims, 5 Drawing Sheets

METHOD, SYSTEM AND APPARATUS FOR IDENTIFYING AN EMERGENCY SERVICE LOCATION OF AN INTERNET PROTOCOL TELEPHONY CLIENT

FIELD OF THE INVENTION

The present invention relates to Internet Protocol (IP) telephony and in particular to a method, system and apparatus for providing emergency service location of an IP telephony client.

BACKGROUND OF THE INVENTION

In the North American emergency services Network, the location of a caller is conveyed to a Public Safety Answering Point (PSAP), a physical location where emergency telephone calls are received, in the form of a telephone number of the calling party. The PSAP uses an Automatic Location Identification (ALI) database, which is pre-populated with the specific location of the caller in order to direct emergency responders (police, fire, ambulance, and rescue) to reach the caller. Voice over IP (VoIP) telephony, however, uses the Internet to make telephone calls, thereby complicating the process of locating a caller due to the mobility of the VoIP telephony devices and corresponding transmission control protocol/Internet protocol (TCP/IP) addresses, i.e., the location of the caller is not static. With the increasing use of VoIP telephony for communications, various governmental bodies, such as the Federal Communication Commission, have begun mandating compliance by VoIP providers with emergency service location processes (911).

Within an enterprise network, there are two types of location information data that can be used to identify an emergency service location of IP telephony clients. The first type is an individual telephone number, such as in the form of a fixed direct inward dial (DID) number, that can be called externally and can be used to identify the individual's location down to the station or desk level. In this instance, each DID number and its fixed location information is stored in the corresponding ALI database. This arrangement works well for conventional Plain Old Telephone System (POTS) wired handsets because these telephones are not mobile and the ALI database can be updated to reflect the relocation or reassignment of DID numbers. The second type is an Emergency Location Identification Number (ELIN), which is a telephone number that can be dialed externally and can be used within a given area within the enterprise to identify a general location. An ELIN is typically implemented as a DID number. The ELIN, when called, will either ring a fixed telephone in the area described by the corresponding ERL or in some cases may be forwarded to the most recent emergency caller that used the ELIN. As such, an ELIN identifies an area's location at a larger level, such as at the floor level.

Since an individual telephone number provides more geographic resolution than an ELIN for locating a caller, it would be ideal to a have separate telephone number assigned to correspond to each IP telephone and have the telephone number and its fixed location information stored in a corresponding ALI database. Thus, for each IP telephone, the most precise location information would be available (i.e., the fixed location information). DID numbers, however, are expensive and typically a company or enterprise will purchase fewer DID numbers than the number of IP telephones that will be utilized. When an IP telephone is used with an assigned DID number, a corresponding entry in the ALI database indicating its expected or normal location is created, typically where the IP telephone was deployed initially. The mobility of IP telephones can quickly result in inaccurate data in the ALI database because all a user has to do is unplug the IP telephone and plug it in at another network jack or disconnect from one Wireless Access Point (WAP) and re-connect to another. The IP telephone will work, but the concordance between the location corresponding to the DID number and the new IP phone location is corrupt. In this scenario, therefore, the problem arises of how to locate an IP telephone when an emergency call is made from a location that is not the static location information stored in the corresponding ALI database. The DID number for that IP telephone should not be used, since the IP telephone is not located at the static location that is stored for that DID number. Further, if the general ELIN is used for all IP telephones on the enterprise network, the precision of the stored static locations corresponding to the DID numbers will be lost.

It is therefore desirable to have a method for providing to an emergency services location process the most precise location information available for an IP telephony client in a network where IP telephony clients may not be located at the static location stored in the corresponding ALI database.

SUMMARY OF THE INVENTION

The present invention advantageously provides a method, system and apparatus for efficiently providing emergency service location of an IP telephony client in a manner that provides greater specificity in location data when available.

In accordance with one aspect, the present invention provides a method for providing emergency service location of an IP telephony client. A request for an emergency call is received from the IP telephony client. Subsequently, it is determined whether an actual location of the IP telephony client is encompassed by a first location data stored at a corresponding Automatic Location Identification (ALI) database that associates a unique identifier of the IP telephony client with the first location data. Lastly, the unique identifier is sent for receipt by a Public Safety Answering Point (PSAP) associated with the ALI database, if the actual location is encompassed by the first location data. An Emergency Location Information Number (ELIN) is sent for receipt by the PSAP if the actual location is not encompassed by the first location data, wherein the ELIN is associated with the actual location at the ALI database.

In accordance with another aspect, the present invention provides a system for providing emergency service location of an IP telephony client. The system includes a receiver for receiving a request for an emergency call from the IP telephony client. The system further includes a database for storing a unique identifier of the IP telephony client, a corresponding actual location data for the IP telephony client and a corresponding first location data for the IP telephony client, wherein the first location data represents location data stored at a corresponding Automatic Location Identification (ALI) database that associates the unique identifier with the first location data. The system further includes a processor configured for comparing the actual location data to the first location data and a transmitter for sending the unique identifier for receipt by a Public Safety Answering Point (PSAP) associated with the ALI database, if the actual location is identical to the first location data. The transmitter is further configured for sending an Emergency Location Information Number (ELIN) for receipt by the PSAP if the actual location is not identical to the first location data, wherein the ELIN is associated with the actual location data at the ALI database.

In accordance with still another aspect, the present invention provides a computer program product comprising a computer usable medium embodying computer usable program code for providing emergency service location of an IP telephony client. The computer program product includes computer usable program code for receiving and reading a request for an emergency call from the IP telephony client. The computer program product further includes computer usable program code for determining whether an actual location of the IP telephony client is encompassed by a first location data stored at a corresponding Automatic Location Identification (ALI) database that associates a unique identifier of the IP telephony client with the first location data. The computer program product further includes computer usable program code for preparing and sending a data packet including the unique identifier for receipt by a Public Safety Answering Point (PSAP) associated with the ALI database, if the actual location is encompassed by the first location data. The computer program product further includes computer usable program code for preparing and sending a data packet including an Emergency Location Information Number (ELIN) for receipt by the PSAP if the actual location is not encompassed by the first location data, wherein the ELIN is associated with the actual location at the ALI database.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
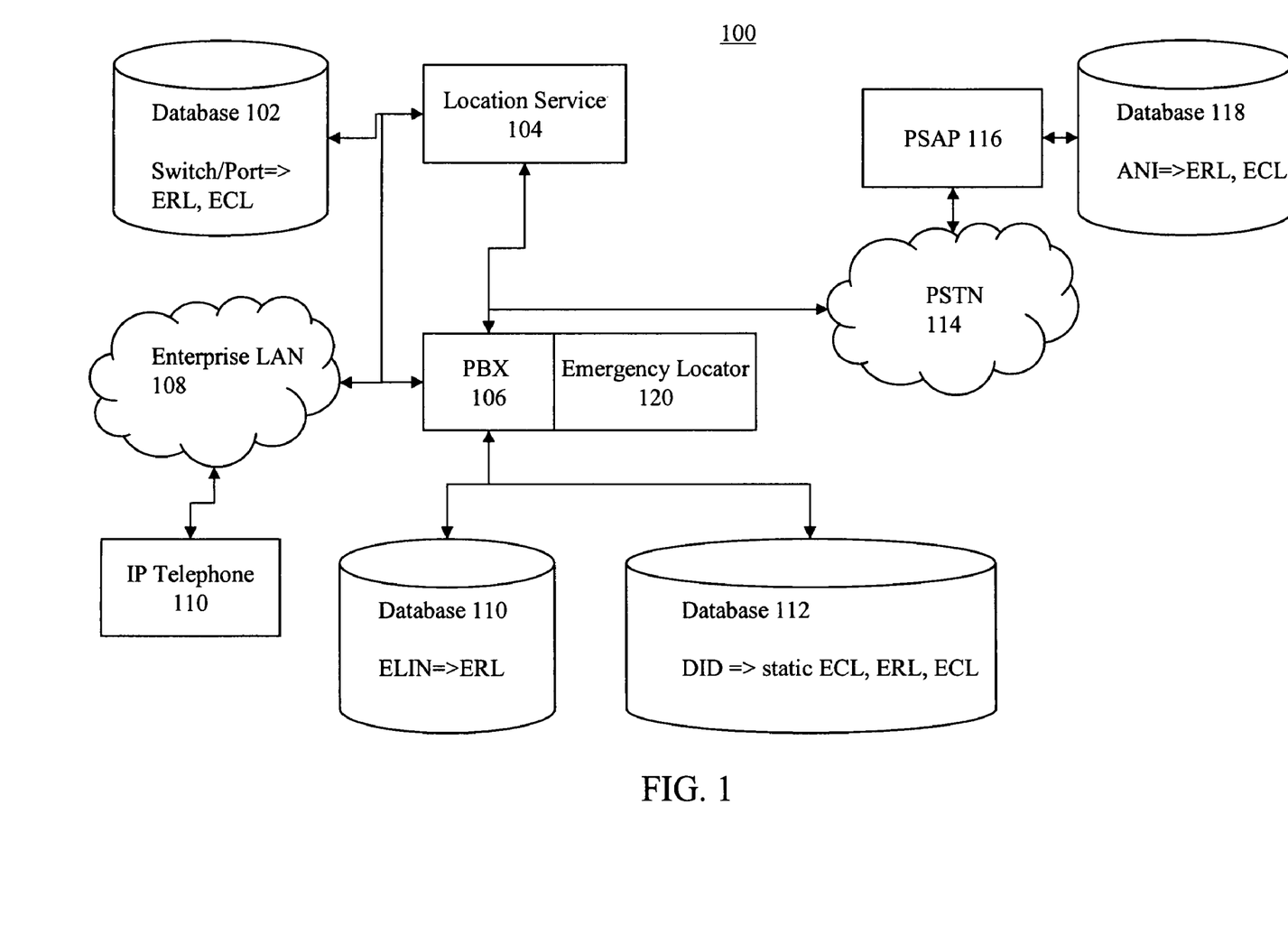
FIG. 1 is a block diagram of a network architecture for a system that provides an emergency service location in accordance with the principles of the present invention.

Referring now to the drawing figures in which like reference designators refer to like elements, there is shown in FIG. 1 a block diagram of an exemplary network architecture of a system 100 that provides an emergency service location for civic addresses, i.e., businesses, companies, organizations, etc., constructed in accordance with the principles of the present invention. FIG. 1 shows an enterprise Local Area Network (LAN) 108 for a computer network that spans a geographical area. A LAN may be confined to a single building or group of buildings. Further, a LAN can be connected to other LANs over any distance via telephone lines, high-speed data lines and radio waves. A system of LANs connected in this way may be referred to as a wide-area network (WAN). The LAN 108 may connect workstations and personal computers, as well as laser printers, servers, databases and any other networkable device.

FIG. 1 further shows an Internet Protocol (IP) telephone 111 connected to the LAN 108. The IP telephone 111 is a standard telephony device having a microphone and a speaker that uses the Voice over Internet Protocol (VoIP) technology. Such an arrangement enables people to use the Internet as the transmission medium for telephone calls by sending packetized voice data using the IP protocol rather than by traditional circuit transmissions of the Public Switched Telephone Network (PSTN), which refers to the international telephone system that was historically based on copper wires carrying analog voice data.

FIG. 1 further shows Private Branch eXchange (PBX) 106 connected to the LAN 108. The PBX 106 is a private telephone network switch used within an enterprise or company. Users of the PBX 106 share a certain number of outside lines for making telephone calls external to the PBX 106. The PBX 106 may include Direct Inward Dialing (DID), a service of a local exchange carrier or local phone company that allows an organization to have numerous individual phone numbers for each person or workstation in its PBX system, which runs off of a small block of dedicated telephone numbers. DID allows multiple users to be connected to the PBX 106 all at once without requiring each user to have a physical line connecting to the local exchange carrier. A DID number refers to a standard ten digit telephone number used to reach an individual within a PBX using the DID service. In another embodiment of the present invention, a DID number may include more or less digits, depending on the telephone numbering convention of the country or area. In yet another embodiment of the present invention, the PBX 106 may be implemented by using a proxy or Back to Back User Agent (B2BUA) utilizing the Session Initiation Protocol (SIP) for Internet telephony.

The PBX 106 is connected to the PSTN 114, which is further connected to a Public Safety Answering Point (PSAP) 116, a physical location where emergency telephone calls, such as 911 calls, are received and then either handled themselves or routed to the proper emergency services. The PSAP 116 uses an Automatic Location Identification (ALI) database 118 to help identify and locate the source of emergency calls made from telephones.

Database 118 uses Automatic Number Identification (ANI) technology to identify a caller by identifying the telephone number of an incoming call. By receiving the incoming telephone number, the caller's address can be identified and expedite response time to emergency calls. The ALI database 118 sets a correspondence between an ANI value (such as a telephone number) and location data, which may be embedded in an Emergency Response Location (ERL) value. An ERL, often regulated by state law, refers to a specific geographic area on a customer's premises. The Emergency Location Information Number (ELIN) is an externally dialable telephone number that is either assigned to a fixed telephone in the area described by the corresponding ERL or dynamically forwarded to the originating emergency caller. The ALI database 118 may include multiple pairs of an ANI value and a corresponding location identifier. In one embodiment of the present invention, an ANI value may be an individual's externally dialable telephone number or an ELIN.

Connected to the PBX 106 is a location service 104, which is a system for determining location information for a caller on a telephone network. The location service 104 may encompass a variety of technologies, including database lookup for a standard wired telephone system, and triangulation or GPS for a mobile telephone system. The location service 104 generically represents any viable service for determining location information for a caller, though below is described system for using a wire map for locating a caller.

Connected to the location service 104 is a database 102 storing a wire map associated with the enterprise LAN 108. The database 102 comprises a compilation of data including a correspondence between a switch or port (for example, a network access port such as a Layer 2 Ethernet switch port) and location data, which may be embedded in an ERL value or an Emergency Caller Location (ECL) value. An ECL value is a set of data that provides more resolution, precision or granularity to the location data provided in an ERL value. In one embodiment of the present invention, an ECL value is a 16-bit value. The purpose of database 102 is to attach location data to a particular switch or port to which an IP telephone, such as 111, is connected. Thus, the database 102 may include a list of multiple switches or ports wherein an ERL or ECL is associated with each switch or port.

Connected to the PBX 106 are databases 110 and 112. Database 110 includes a list of correspondences between ELIN values of telephones within PBX 106 and ERL values. That is, for each ELIN in the database 110, there is an ERL associated with it. Database 112 includes a list of correspondences between DID values of telephones within PBX 106 and 1) a static ECL value, 2) a dynamic ECL value and 3) a dynamic ERL value. For each DID in the database 112, there is a static ECL, a dynamic ECL and dynamic ERL associated with it. A static ECL refers to the ECL associated with a DID in the ALI database 118. A dynamic ECL value refers to the current actual location of an IP telephone. A dynamic ERL value refers to the current actual location of an IP telephone. This is explained in greater detail below with reference to FIGS. 3 and 5. It should be noted that although FIG. 1 shows databases 110 and 112 existing as two separate entities, in other embodiments the databases 110 and 112 may be integrated or separate databases physically located within the same computing device.

Lastly, FIG. 1 shows emergency locator 120 connected to PBX 120. Emergency locator 120 substantially executes the method of the present invention. It should be noted that although FIG. 1 shows emergency locator 120 existing as a separate entity, in another embodiment the emergency locator 120 may be integrated into other entities of FIG. 1, such as PBX 106. Alternatively, the functions of emergency locator 120 may be distributed over more than one entity shown in FIG. 1 as in a distributed computing paradigm. In one embodiment of the present invention, databases 102, 110 and 112 are accessed using a database management system, a collection of programs that enables a user to store, modify, and extract information from a database.

In another embodiment of the present invention, the computer systems of PBX 106 and emergency locator 120 are one or more Personal Computers (PCs), mini or main-frame computers, Personal Digital Assistants (PDAs), hand held computers, palm top computers, lap top computers, smart phones or any other information processing devices. Of course, PBX 106 can also be a traditional PBX as is known in the art, adapted to perform the functions described herein. A PC can be one or more IBM or compatible PC workstations running a Microsoft Windows or LINUX operating system, one or more Macintosh computers running a Mac OS operating system, or an equivalent.

Figure 2:
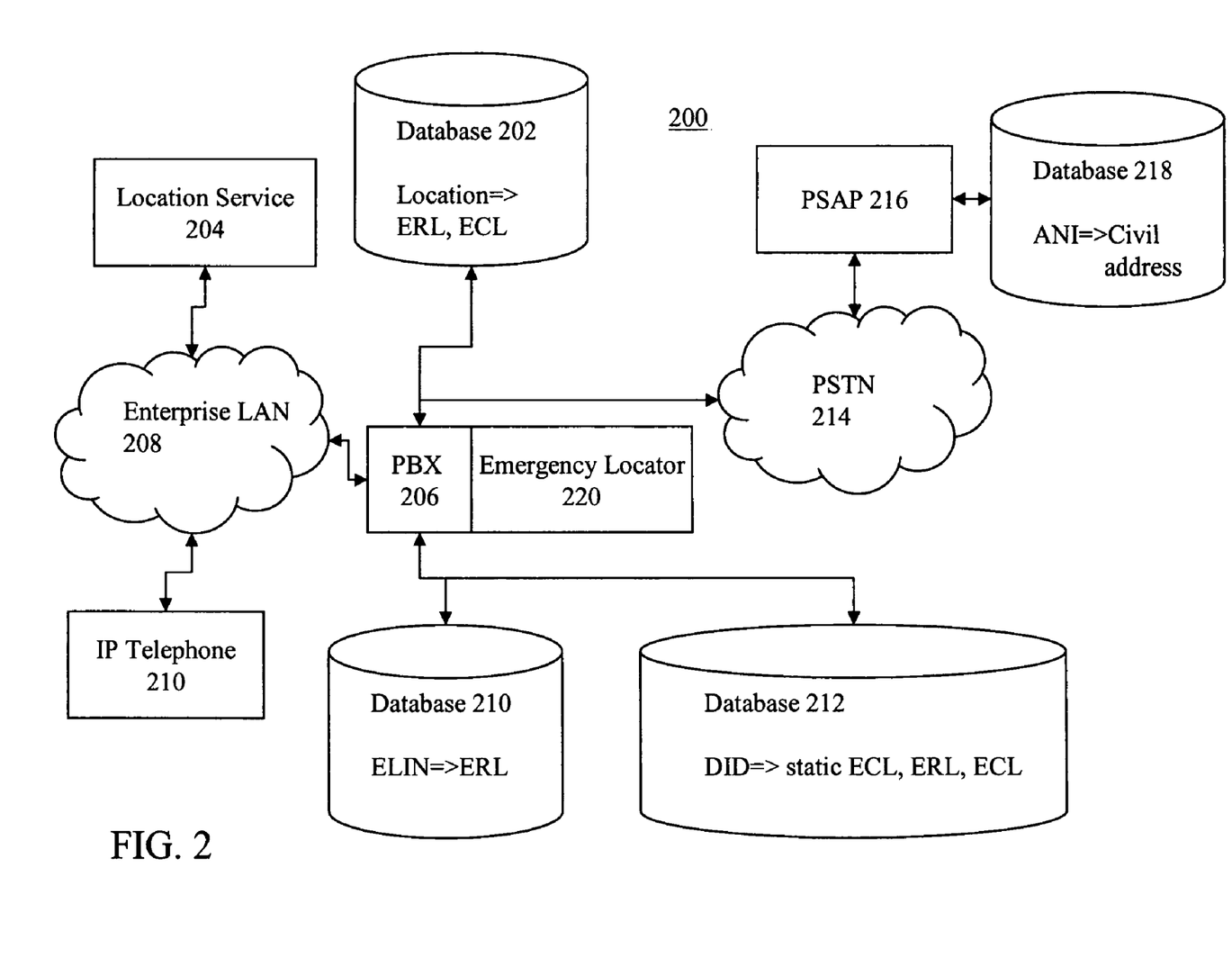
FIG. 2 is a block diagram of a network architecture for an alternate system that provides an emergency service location in accordance with the principles of the present invention.

FIG. 2 is a block diagram of the network architecture of an alternate system 200 for providing emergency service location for civil addresses (i.e., country, state, city, street, floor number, room number, etc. or a geodetic location, such as a GPS-derived location) in accordance with the principles of the present invention. FIG. 2 shows LAN 208, similar to LAN 108, connected to a location service 204, which performs substantially the same functions as location service 104. An IP telephone 211 is connected to LAN 108. System 200 further shows a PBX 206 connected to the LAN 208 and further a location database 202 connected to the PBX 206. The database 202 sets a correspondence between a location value (in a civil address or geodetic format) and location data, which may be embedded in an ERL and ECL value. Thus, the database 202 includes multiple pairs of a location value and an ERL, ECL.

FIG. 2 further shows PBX 206 connected to databases 210, 212, similar to databases 110, 112. Further shown is PSTN 214, which is further connected to PSAP 216 and database 218, which are identical to PSTN 114, PSAP 116 and database 118. Also shown is emergency locator 220, which performs substantially the same functions as emergency locator 120.

Figure 3:
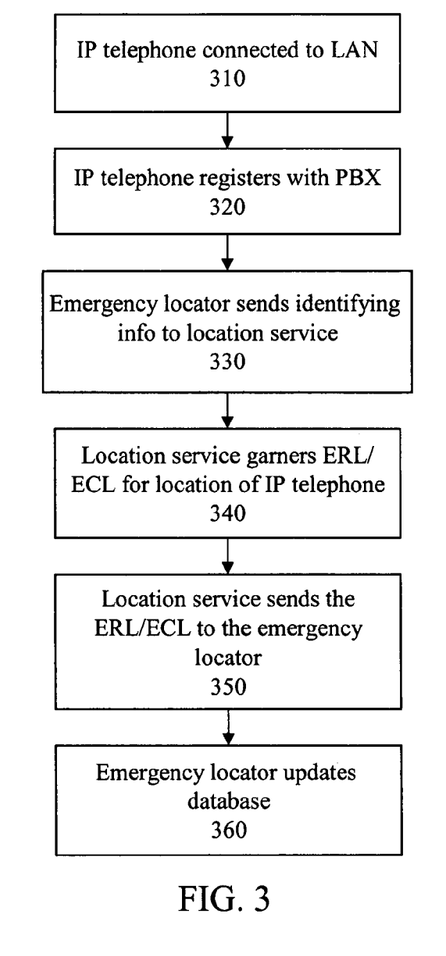
FIG. 3 is a flow chart of a registration process of an IP telephony client in accordance with the principles of the present invention.

FIG. 3 is a flow chart of the registration process of an IP telephony client in accordance with the principles of the present invention. The flow chart of FIG. 3 shows the steps that occur when an IP telephony client, such as IP telephone 111, is connected to the LAN 108 and proceeds to register with the system 100. In block 310, the IP telephone 111 connects to the LAN 108 via, for example, a Layer 2 switch using an Ethernet adapter card or a Wireless Access Point (WAP) using a wireless protocol such as 802.11. The LAN 108 reads and stores the IP address and Media Access Control (MAC) address for the IP telephone 111. In block 320, the IP telephone 111 registers with the PBX 106 by providing its MAC and/or IP address and other identifying information.

In block 330, the emergency locator 120 sends to the location service 104 the identifying information for the IP telephone 111, such as the MAC address, IP address and/or the switch or port to which the IP telephone 111 is connected. In block 340, the location service 104 polls the database 102 and garners the ERL and/or ECL corresponding to the identifying information for the IP telephone 111. In block 350, the location service 104 sends to the emergency locator 120 the ERL and ECL corresponding to the IP telephone 111. In block 360, the emergency locator 120 updates the database 112 with the ERL and ECL corresponding to the IP telephone 111, i.e., the dynamic ERL and the dynamic ECL associated with the DID number of the IP telephone 111 are updated. More generally, in block 360 the record associated with the IP telephone 111 is updated.

It should be noted that prior to the process of FIG. 3, the ALI database, i.e., database 118, has been updated with location information (civil or geodetic) corresponding to a unique identifier for the IP telephone 111, such as a DID or a ten digit telephone number. Furthermore, prior to the process of FIG. 3, the database 110 has been updated with an ERL corresponding to any ELIN corresponding to a telephone of LAN 108. Lastly, prior to the process of FIG. 3, the database 112 has been updated with a static ECL corresponding to any DID of a telephone of LAN 108. More generally, the record in database 112 associated with a DID of a telephone is updated prior to the process of FIG. 3. A static ECL refers to the same location information that is stored for a particular DID in the corresponding ALI database 118.

Figure 4:
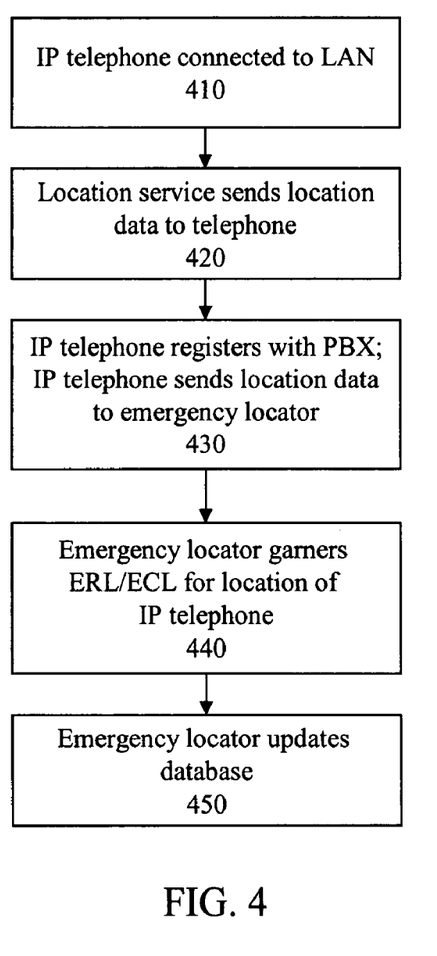
FIG. 4 is a flow chart of an alternate registration process of an IP telephony client in accordance with the principles of the present invention.

FIG. 4 is a flow chart of an alternate registration process of an IP telephony client in accordance with the principles of the present invention. The flow chart of FIG. 4 shows the steps that occur when an IP telephony client, such as IP telephone 211, is connected to the LAN 208 and proceeds to register with the system 200. In block 410, the IP telephone 211 connects to the LAN 208 via a Layer 2 switch or a WAP. The LAN 208 reads and stores the IP and MAC address for the IP telephone 211. In block 420, in response to a Dynamic Host Configuration Protocol (DHCP) request from the IP telephone 211, the location service 204 sends to the telephone 211 location data (in civil or geodetic format) corresponding to the actual location of IP telephone 211. In another embodiment of the present invention, an alternative mechanism or protocol to DHCP may be executed for acquiring the location data of the telephone 211.

In block 430, the IP telephone 211 registers with the PBX 206 using its MAC and/or IP address. Further, the IP telephone 211 sends to the emergency locator 220 the location data received from location service 204. In block 440, the emergency locator 220 polls the database 202 and garners the ERL and ECL corresponding to the location data for the IP telephone 211. In block 450, the emergency locator 220 updates the database 212 with the ERL and ECL corresponding to the IP telephone 211, i.e., the dynamic ERL and the dynamic ECL associated with the DID of the IP telephone 211 are updated. More generally, record in database 212 that corresponds to the DID of the telephone 211 is updated.

Figure 5:
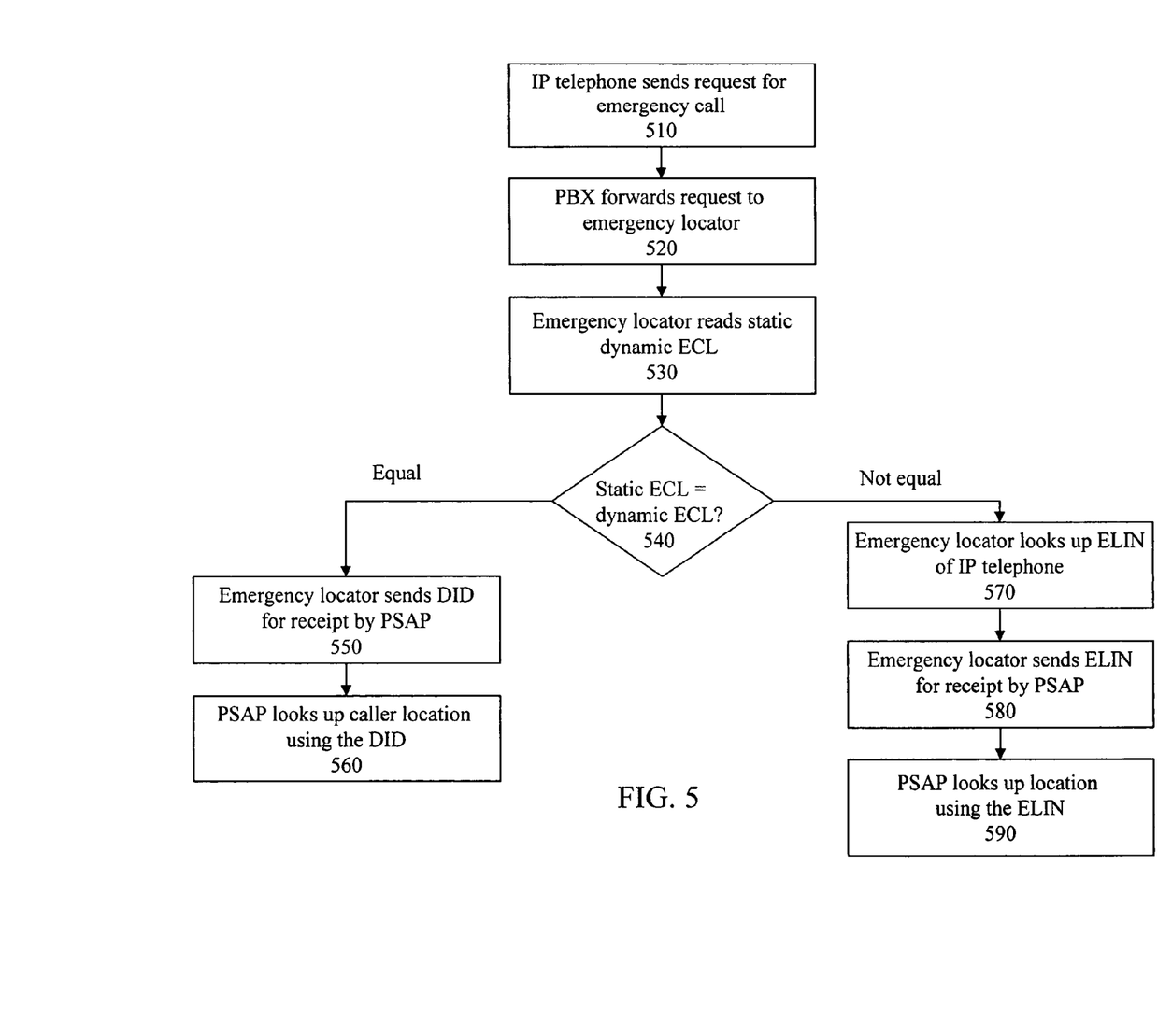
FIG. 5 is a flow chart of the emergency service location provision process in accordance with the principles of the present invention.

FIG. 5 is a flow chart of the emergency service location provision process in accordance with the principles of the present invention. The flow chart of FIG. 5 shows the steps that occur when an IP telephony client, such as an IP telephone 111 or 211, makes an emergency call, such as a 911 call, and the emergency service location provision process is initiated. In block 510, the IP telephone 111 sends a request for an emergency call, such as a 911 call. In block 520, the PBX 106 receives the request and forwards the request to the emergency locator 120. In block 530, the emergency locator 120 reads the static ECL and the dynamic ECL corresponding to the DID of the IP telephone 111. More generally, the record in database 112 associated with the DID of telephone 11 is read.

In block 540, it is determined whether the static ECL and the dynamic ECL are identical. If the two are identical, then control flows to block 550. If the two are not identical, then control flows to block 570. In block 550, the emergency locator 120 sends the DID of the IP telephone 111 for receipt by the PSAP 116 as the ANI. In block 560, the PSAP 116 utilizes the DID to look up the corresponding location in the ALI database 118. In block 570, the emergency locator 120 looks up the ERL of the IP telephone 111 in the database 112, using its DID. Then, the emergency locator 120 looks up the ELIN of the IP telephone 111 in the database 110, using its ERL. In block 580, the emergency locator 120 sends the ELIN of the IP telephone 111 for receipt by the PSAP 116 as the ANI. In block 590, the PSAP 116 utilizes the ELIN to look up the corresponding location in the ALI database 118.

The present invention can be realized in hardware, software, or a combination of hardware and software. An implementation of the method and system of the present invention can be realized in a centralized fashion in one computing system or in a distributed fashion where different elements are spread across several interconnected computing systems. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A method for providing emergency service location of an IP telephony client, comprising:
   receiving a request for an emergency call from the IP telephony client;
   determining whether an actual location of the IP telephony client is encompassed by a first location data stored at a corresponding Automatic Location Identification (ALI) database that associates a unique identifier of the IP telephony client with the first location data;
   sending the unique identifier for receipt by a Public Safety Answering Point (PSAP) associated with the ALI database, if the actual location is encompassed by the first location data; and
   sending an Emergency Location Information Number (ELIN) for receipt by the PSAP if the actual location is not encompassed by the first location data, wherein the ELIN is associated with the actual location in the ALI database.

2. The method of claim 1, wherein the unique identifier comprises a ten digit number.

3. The method of claim 1, wherein the step of determining comprises:
   reading actual location data for the IP telephony client from a database;
   reading the first location data for the IP telephony client from the database; and
   comparing the actual location data to the first location data.

4. The method of claim 3, wherein the first step of sending comprises:
   sending the unique identifier for receipt by a PSAP associated with the ALI database, if the actual location data is identical to the first location data.

5. The method of claim 4, wherein the second step of sending comprises:
   sending an ELIN for receipt by the PSAP if the actual location data is not identical to the first location data, wherein the ELIN is associated with the actual location at the ALI database.

6. The method of claim 1, wherein the first step of sending comprises:
   sending via a Public Switched Telephone Network (PSTN) the unique identifier for receipt by a PSAP associated with the ALI database, if the actual location data is encompassed by the first location data.

7. A system for providing emergency service location of an IP telephony client, comprising:
   a receiver for receiving a request for an emergency call from the IP telephony client;
   a database for storing a unique identifier of the IP telephony client, a corresponding actual location data for the IP telephony client and a corresponding first location data for the IP telephony client, wherein the first location data represents location data stored at a corresponding Automatic Location Identification (ALI) database that associates the unique identifier with the first location data;

a processor configured for comparing the actual location data to the first location data;

a transmitter for sending the unique identifier for receipt by a Public Safety Answering Point (PSAP) associated with the ALI database, if the actual location is identical to the first location data and for sending an Emergency Location Information Number (ELIN) for receipt by the PSAP if the actual location is not identical to the first location data, wherein the ELIN is associated with the actual location data at the ALI database.

8. The system of claim 7, wherein the request for an emergency call is received over a Local Area Network (LAN).

9. The system of claim 8, wherein the unique identifier comprises a ten digit number.

10. The system of claim 8, wherein the actual location data comprises a 16-bit value.

11. The system of claim 8, wherein the transmitter sends the unique identifier to the PSAP over a public switched telephone network.

12. The system of claim 8, wherein the ELIN comprises a ten digit number.

13. A machine readable storage device having stored thereon a computer program for providing emergency service location of an IP telephony client, the computer program comprising a set of instructions which when executed by a machine causes the machine to perform a method comprising:

receiving and reading a request for an emergency call from the IP telephony client;

determining whether an actual location of the IP telephony client is encompassed by a first location data stored at a corresponding Automatic Location Identification (ALI) database that associates a unique identifier of the IP telephony client with the first location data;

preparing and sending a data packet including the unique identifier for receipt by a Public Safety Answering Point (PSAP) associated with the ALI database, if the actual location is encompassed by the first location data; and preparing and sending a data packet including an Emergency Location Information Number (ELIN) for receipt by the PSAP if the actual location is not encompassed by the first location data, wherein the ELIN is associated with the actual location at the ALI database.

14. The method of claim 13, wherein the unique identifier comprises a ten digit number.

15. The method of claim 13, wherein when executed, the set of instructions for determining perform a method comprising:

reading actual location data for the IP telephony client from a database;

reading the first location data for the IP telephony client from the database; and comparing the actual location data to the first location data.

16. The method of claim 15, wherein when executed, the set of instructions for preparing and sending perform a method comprising:

preparing and sending a data packet including the unique identifier for receipt by a PSAP associated with the ALI database, if the actual location data is identical to the first location data.

17. The method of claim 16, wherein when executed, set of instructions for preparing and sending perform a method comprising:

preparing and sending a data packet including an ELIN for receipt by the PSAP if the actual location data is not identical to the first location data, wherein the ELIN is associated with the actual location at the ALI database.

* * * * *